US012573511B2

(12) United States Patent
Knight

(10) Patent No.: US 12,573,511 B2
(45) Date of Patent: Mar. 10, 2026

(54) NUCLEAR POWER PLANT HAVING A PRIMARY CORE CATCHER SURROUNDED BY A SECONDARY CORE CATCHER

(71) Applicant: Rolls-Royce SMR Limited, Derby (GB)

(72) Inventor: Andrew Knight, Derby (GB)

(73) Assignee: Rolls-Royce SMR Limited, Derby (GB)

( * ) Notice: Subject to any disclaimer, the term of this patent is extended or adjusted under 35 U.S.C. 154(b) by 424 days.

(21) Appl. No.: 18/016,053

(22) PCT Filed: Jul. 14, 2021

(86) PCT No.: PCT/EP2021/069589
§ 371 (c)(1),
(2) Date: Jan. 13, 2023

(87) PCT Pub. No.: WO2022/013283
PCT Pub. Date: Jan. 20, 2022

(65) Prior Publication Data
US 2023/0274846 A1 Aug. 31, 2023

(30) Foreign Application Priority Data
Jul. 16, 2020 (GB) ...................................... 2010942

(51) Int. Cl.
*G21C 9/016* (2006.01)
*G21C 13/02* (2006.01)

(52) U.S. Cl.
CPC ............. *G21C 13/02* (2013.01); *G21C 9/016* (2013.01)

(58) Field of Classification Search
CPC ...................................................... G21C 9/016
See application file for complete search history.

(56) References Cited

U.S. PATENT DOCUMENTS 3,930,939 A 1/1976 Bitterman et al.
3,945,883 A 3/1976 Hind et al.
(Continued)

FOREIGN PATENT DOCUMENTS

CN 103377724 A 10/2013
CN 105047235 A * 11/2015
(Continued)

OTHER PUBLICATIONS

Fischer, Manfred, and Torsten Keim. "Retrofitting of ex-vessel core catchers into operating nuclear power plants at the example of a Mark-I BWR." Annals of Nuclear Energy 146 (2020): 107646. (Year: 2020).*
(Continued)

*Primary Examiner* — Lily C Garner
(74) *Attorney, Agent, or Firm* — Quarles & Brady LLP

(57) ABSTRACT

A nuclear power plant has a nuclear reactor including a reactor pressure vessel which houses plural fuel rods containing fissile material. The nuclear power plant further has means for submerging the reactor pressure vessel in water and thereby water-cooling the reactor pressure vessel in the event of an emergency requiring cooling of the nuclear reactor. The nuclear power plant further has a primary core catcher outwardly of the reactor pressure vessel, the primary core catcher being formed of a material suitable for retaining molten corium in the event corium escapes the reactor pressure vessel. The nuclear power plant further has secondary core catcher outwardly of the primary core catcher, the secondary core catcher lining a tank which is water-filled in normal use of the plant to submerge and thereby water-cool the primary core catcher. The secondary core catcher is also is formed of a material suitable for retaining molten corium in the event corium escapes the primary core catcher.

11 Claims, 2 Drawing Sheets

(56) References Cited

U.S. PATENT DOCUMENTS

| | | | | |
|---|---|---|---|---|
| H91 | H | 7/1986 | Gabor et al. | |
| 5,307,390 | A | 4/1994 | Gou et al. | |
| 5,343,506 | A | 8/1994 | Artnik et al. | |
| 10,186,334 | B2 * | 1/2019 | Reyes, Jr. | G21C 13/024 |
| 2012/0121056 | A1 * | 5/2012 | Sato | G21C 13/10 376/280 |
| 2014/0241483 | A1 | 8/2014 | Institute | |
| 2016/0141054 | A1 | 5/2016 | No | |
| 2020/0126680 | A1 * | 4/2020 | Kim | G21C 15/25 |

FOREIGN PATENT DOCUMENTS

| | | | | | |
|---|---|---|---|---|---|
| CN | 207572071 | U | * | 7/2018 | |
| CN | 109102906 | A | | 12/2018 | |
| CN | 109346197 | A | | 2/2019 | |
| CN | 110459333 | A | | 11/2019 | |
| CN | 111128414 | A | * | 5/2020 | G21C 15/02 |
| DE | 4032736 | A1 | * | 4/1992 | G21C 9/016 |
| EP | 2218077 | A2 | | 1/2013 | |
| GB | 1507039 | A | | 4/1978 | |
| GB | 2236210 | A | | 3/1991 | |
| JP | 11242091 | A | * | 11/1992 | |
| JP | 06-503885 | | | 4/1994 | |
| JP | 06-222177 | | | 8/1994 | |
| JP | 2013-104711 | | | 8/1994 | |
| JP | 11-509319 | | | 8/1999 | |
| JP | 2009-058496 | | | 3/2009 | |
| JP | 2011-501811 | | | 1/2011 | |
| JP | 2011-503614 | | | 1/2011 | |
| JP | 2017194359 | A | * | 10/2017 | |
| WO | WO 85/00921 | A1 | | 2/1985 | |
| WO | WO 2018/236098 | A1 | | 12/2018 | |
| WO | WO-2022126445 | A1 | * | 6/2022 | G21C 15/18 |
| WO | WO-2024012675 | A1 | * | 1/2024 | G21C 9/016 |

OTHER PUBLICATIONS

GB Search Report, GB Application No. 2010942.7, United Kingdom Intellectual Property Office, dated Nov. 24, 2020, 4 pages.

International Search Report & Written Opinion, International Application No. PCT/EP2021/069589, dated Oct. 12, 2021, 12 pages.

JP Office Action, Application No. 2023-502807, dated Feb. 12, 2025, 7 pages.

First Office Action, corresponding to CN202180051922.3, dated Aug. 22, 2025.

* cited by examiner

NUCLEAR POWER PLANT HAVING A PRIMARY CORE CATCHER SURROUNDED BY A SECONDARY CORE CATCHER

RELATED APPLICATIONS

This application is a 35 U.S.C. § 371 national phase application of PCT/EP2021/069589 (WO2022/013283-A1), filed on Jul. 14, 2021, entitled "NUCLEAR POWER PLANT", and claims priority to GB-2010942.7 filed on Jul. 16, 2020, which is incorporated herein by reference in its entirety.

The present disclosure relates to a nuclear power plant.

Nuclear power plants convert heat energy from the nuclear decay of fissile material contained in fuel assemblies into electrical energy. Pressurised water reactor (PWR) nuclear power plants have a primary coolant circuit which typically connects the following pressurised components: a reactor pressure vessel (RPV) containing the fuel assemblies; one or more steam generators; and one or more pressurizers. Coolant pumps in the primary circuit circulate pressurised water through pipework between these components. The RPV houses the nuclear reactor which heats the water in the primary circuit. The steam generator functions as a heat exchanger between the primary circuit and a secondary circuit where pressurised steam is generated to power turbines. The pressurizers maintain pressure typically of around 155 bar in the primary circuit.

After passing through the turbines, the pressurised steam of the secondary circuit is cooled down and condensed in one or more condensers before returning to the steam generators. The condensers transfer heat from the condensed steam to a tertiary circuit which circulates water between a tertiary heatsink (i.e. the sea, a lake, or a river) and the condensers, the tertiary heatsink being the ultimate destination for waste heat from the plant.

Nuclear power plant safety systems are designed to protect against a range of faults. The successful action of these safety measures ensures that plant conditions remain within safety limits. Failure of these safety measures can result in core damage, termed a "severe accident". Severe accident safety systems may be included within nuclear power plant designs so that, by confining radiological material within a containment structure of the plant, people and the environment are protected from the harmful effects of ionising radiation.

In particular, engineering structures can be included in the plant to confine a molten core, water being supplied to cool these structures and maintain their structural integrity, and a separate heatsink being provided to remove the heat from the containment system.

In general terms, the present disclosure provides a nuclear power plant having enhanced safety by having multiple molten core emergency containment levels.

In a first aspect, the present disclosure provides a nuclear power plant having:

- a nuclear reactor including a reactor pressure vessel which houses plural fuel rods containing fissile material,
- means for water-cooling the exterior of reactor pressure vessel in the event of an emergency requiring cooling of the nuclear reactor;
- a primary core catcher outwardly of the reactor pressure vessel, the primary core catcher being formed of a material suitable for retaining molten corium in the event corium escapes the reactor pressure vessel; and
- a secondary core catcher outwardly of the primary core catcher, the secondary core catcher lining a tank which is water-filled in normal use of the plant to submerge and thereby water-cool the primary core catcher, the secondary core catcher being formed of a material suitable for retaining molten corium in the event corium escapes the primary core catcher.

For molten corium from a core melt to escape the plant, at least three safety containment levels of the plant must have failed, i.e. the external water-cooling of the reactor pressure vessel, the water-cooled primary core catcher, and the secondary core catcher. Therefore, the likelihood of total confinement failure is significantly reduced. This reduced likelihood is further enhanced by the substantial independence of the three containment levels. In addition, in progressing from the innermost to the outermost containment levels, the melt temperature and melt volume will increase as it moves through the levels, the melt temperature increasing due to decay heat, and the melt volume increasing due to mixing of the molten core with firstly molten material of the reactor pressure vessel and secondly with molten material of the primary core catcher. This temperature increase causes the temperature difference with the surroundings and the out-of-containment molten corium to increase, eventually promoting greater heat fluxes from the melt and improving the likelihood of solidification. The delay in having to progress through the levels also reduces the decay heat levels in addition, the increased volume reduces the decay heat volumetric density, again increasing the likelihood of solidification.

In a second aspect, the present disclosure provides a method of operating the nuclear power plant of the first aspect, the method including:

- normally operating the power plant, the outer surface of the reactor pressure vessel being surrounded by air during the normal operation; and
- water-cooling the exterior of the reactor pressure vessel in the event of an emergency requiring cooling of the nuclear reactor, or in the event of a safety test of the power plant.

Optional features of the nuclear power plant will now be set out. These are applicable singly or in any combination with any aspect of the disclosure.

The means for water cooling the reactor pressure vessel may comprise means for submerging the reactor pressure vessel in water.

The means for submerging the reactor pressure vessel in water may comprise a water retention jacket outside the reactor pressure vessel, the jacket being spaced from the reactor pressure vessel such that a cavity between the jacket and the reactor pressure vessel is fillable with water to submerge and thereby water-cool the reactor pressure vessel in the event of the emergency. Such a water retention jacket can be the primary core catcher, but more preferably the water retention jacket is a separate component, the primary core catcher being outward of both the reactor pressure vessel and the water retention jacket, e.g. with an air gap between the jacket and the primary core catcher.

Conveniently, the aforementioned water retention jacket may function as a thermal insulation shield in normal operation of the nuclear reactor to retain heat in the reactor, the cavity between the jacket and the reactor pressure vessel being an air cavity in such normal operation.

The means for submerging the reactor pressure vessel may further comprise a supply system for supplying the water for submerging the reactor pressure vessel in the event of the emergency, e.g. for supplying water to the cavity between the water retention jacket and the reactor. For example, the supply system may include one or more storage tanks which can gravity feed the water to the cavity. Such a gravity feed can reduce reliance on pumps and other powered devices.

In alternative embodiments, the means for water cooling the exterior of the reactor pressure vessel may comprise spraying the exterior with water or submerging the exterior in water.

The plant may further have one or more heat exchangers arranged to condense steam formed by the boiling of the water submerging the reactor pressure vessel. For example, the plant may be arranged, e.g. via the shaping of a containment structure for the plant, such that the condensed steam is returned to the cavity between the jacket and the reactor pressure vessel. The cold side of the heat exchangers can be one or more local heatsinks, such as further water tanks. The one or more heat exchangers may further be arranged to condense steam formed by the boiling of the water in the water-filled tank.

The primary core catcher is typically a metal core catcher, e.g. a steel core catcher. However, the primary core catcher may alternatively be a ceramic core catcher.

The secondary core catcher is typically a ceramic core catcher. As noted earlier, if the molten core reaches the secondary core catcher it will have melted through the reactor pressure vessel and the primary core catcher, both of which typically have melting points of around 1500° (e.g. if formed of steel). Accordingly, by forming the secondary core catcher of ceramic material, its melting point can be enhanced to e.g. greater than 2000° C., which may enable the molten core to solidify thereon without causing a breaching. The secondary core catcher may be externally air cooled. In some embodiments the secondary core catcher may comprise a metal core catcher. The secondary core catcher may take the form of the lining to a tank.

The present invention may comprise or be comprised as part of a nuclear reactor power plant (referred to herein as a nuclear reactor). In particular, the present invention may relate to a Pressurized water reactor. The nuclear reactor power plant may have a power output between 250 and 600 MW or between 300 and 550 MW.

The nuclear reactor power plant may be a modular reactor. A modular reactor may be considered as a reactor comprised of a number of modules that are manufactured off site (e.g. in a factory) and then the modules are assembled into a nuclear reactor power plant on site by connecting the modules together. Any of the primary, secondary and/or tertiary circuits may be formed in a modular construction.

The nuclear reactor of the present disclosure may comprise a primary circuit comprising a reactor pressure vessel; one or more steam generators and one or more pressurizer. The primary circuit circulates a medium (e.g. water) through the reactor pressure vessel to extract heat generated by nuclear fission in the core, the heat is then to delivered to the steam generators and transferred to the secondary circuit. The primary circuit may comprise between one and six steam generators; or between two and four steam generators; or may comprise three steam generators; or a range of any of the aforesaid numerical values. The primary circuit may comprise one; two; or more than two pressurizers. The primary circuit may comprise a circuit extending from the reactor pressure vessel to each of the steam generators, the circuits may carry hot medium to the steam generator from the reactor pressure vessel, and carry cooled medium from the steam generators back to the reactor pressure vessel. The medium may be circulated by one or more pumps. In some embodiments, the primary circuit may comprise one or two pumps per steam generator in the primary circuit.

In some embodiments, the medium circulated in the primary circuit may comprise water. In some embodiments, the medium may comprise a neutron absorbing substance added to the medium (e.g., boron, gadolinium). In some embodiments the pressure in the primary circuit may be at least 50, 80 100 or 150 bar during full power operations, and pressure may reach 80, 100, 150 or 180 bar during full power operations. In some embodiments, where water is the medium of the primary circuit, the heated water temperature of water leaving the reactor pressure vessel may be between 540 and 670 K, or between 560 and 650 K, or between 580 and 630 K during full power operations, in some embodiments, where water is the medium of the primary circuit, the cooled water temperature of water returning to the reactor pressure vessel may be between 510 and 600 k, or between 530 and 580 K during full power operations.

The nuclear reactor of the present disclosure may comprise a secondary circuit comprising circulating loops of water which extract heat from the primary circuit in the steam generators to convert water to steam to drive turbines. In embodiments, the secondary loop may comprise one or two high pressure turbines and one or two low pressure turbines.

The secondary circuit may comprise a heat exchanger to condense steam to water as it is returned to the steam generator. The heat exchanger may be connected to a tertiary loop which may comprise a large body of water to act as a heat sink.

The reactor vessel may comprise a steel pressure vessel, the pressure vessel may be from 5 to 15 m high, or from 9.5 to 11.5 m high and the diameter may be between 2 and 7 m, or between 3 and 6 m, or between 4 to 5 m. The pressure vessel may comprise a reactor body and a reactor head positioned vertically above the reactor body. The reactor head may be connected to the reactor body by a series of studs that pass through a flange on the reactor head and a corresponding flange on the reactor body.

The reactor head may comprise an integrated head assembly in which a number of elements of the reactor structure may be consolidated into a single element. Included among the consolidated elements are a pressure vessel head, a cooling shroud, control rod drive mechanisms, a missile shield, a lifting rig, a hoist assembly, and a cable tray assembly.

The nuclear core may be comprised of a number of fuel assemblies, with the fuel assemblies containing fuel rods. The fuel rods may be formed of pellets of fissile material. The fuel assemblies may also include space for control rods. For example, the fuel assembly may provide a housing for a 17×17 grid of rods i.e. 289 total spaces. Of these 289 total spaces, 24 may be reserved for the control rods for the reactor, each of which may be formed of 24 control rodlets connected to a main arm, and one may be reserved for an instrumentation tube. The control rods are movable in and out of the core to provide control of the fission process undergone by the fuel, by absorbing neutrons released during nuclear fission. The reactor core may comprise between 100-300 fuel assemblies. Fully inserting the control rods may typically lead to a subcritical state in which the reactor is shutdown. Up to 100% of fuel assemblies in the reactor core may contain control rods.

Movement of the control rod may be moved by a control rod drive mechanism. The control rod drive mechanism may command and power actuators to lower and raise the control rods in and out of the fuel assembly, and to hold the position of the control rods relative to the core. The control rod drive mechanism rods may be able to rapidly insert the control rods to quickly shut down (i.e. scram) the reactor.

The primary circuit may be housed within a containment structure to retain steam from the primary circuit in the event of an accident. The containment may be between 15 and 60 m in diameter, or between 30 and 50 m in diameter. The containment structure may be formed from steel or concrete, or concrete lined with steel. The containment may house one or more lifting devices (e.g. a polar crane). The lifting device may be housed in the top of the containment above the reactor pressure vessel. The containment may contain within or support exterior to, a water tank for emergency cooling of the reactor. The containment may contain equipment and facilities to allow for refuelling of the reactor, for the storage of fuel assemblies and transportation of fuel assemblies between the inside and outside of the containment.

The power plant may contain one or more civil structures to protect reactor elements from external hazards (e.g. missile strike) and natural hazards (e.g. tsunami). The civil structures may be made from steel, or concrete, or a combination of both.

Embodiments will now be described by way of example only, with reference to the following drawings in which.

Figure 1:
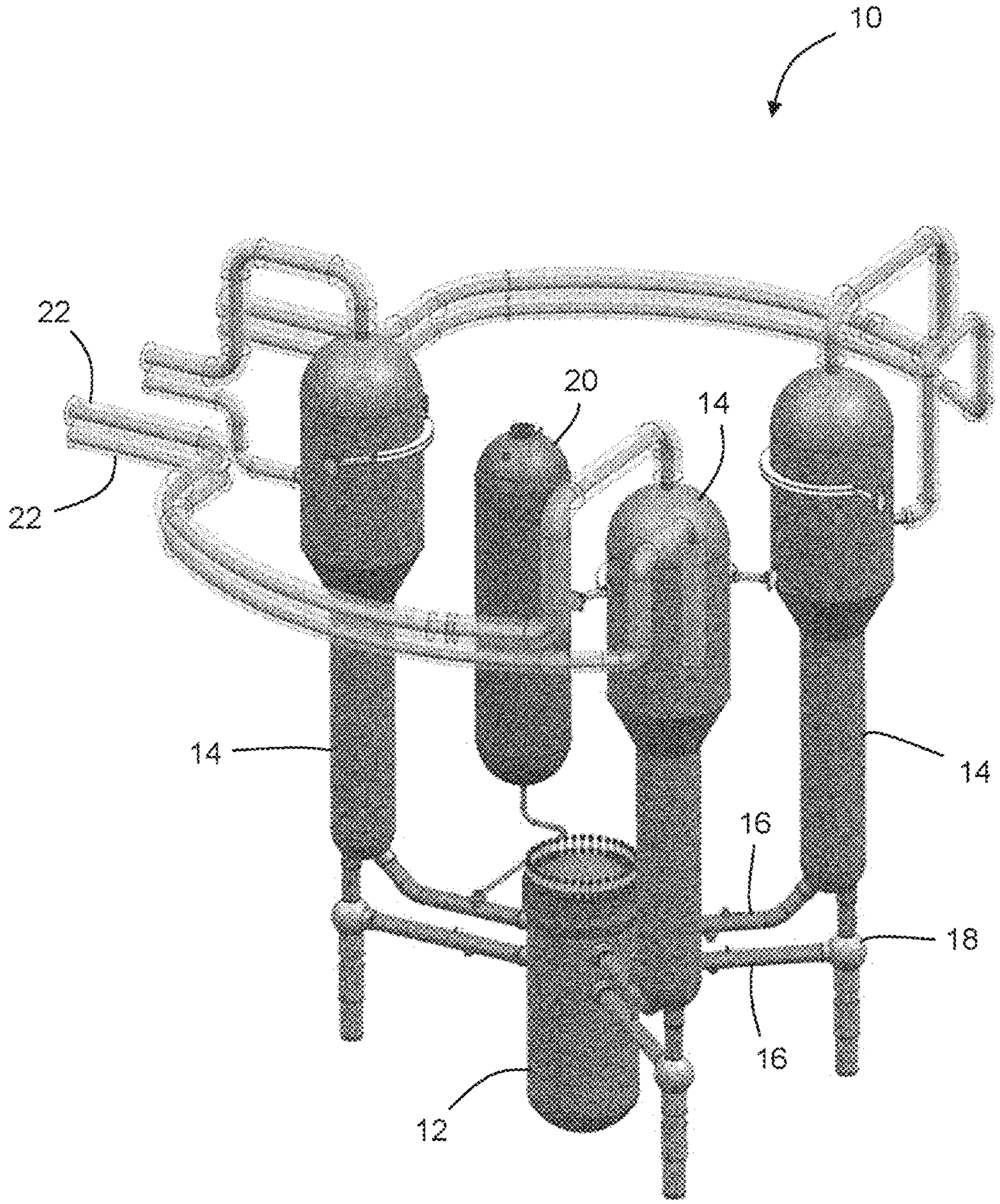
FIG. 1 is a schematic diagram of parts of a PWR nuclear power plant.

An RPV 12 containing fuel assemblies is centrally located in the plant 10. Clustered around the RPV are three steam generators 14 connected to the RPV by pipework 16 of the pressurised water, primary coolant circuit. Coolant pumps 18 circulate pressurised water around the primary coolant circuit, taking heated water from the RPV to the steam generators, and cooled water from the steam generators to the RPV.

A pressurises 20 maintains the water pressure in the primary coolant circuit at about 155 bar.

In the steam generators 14, heat exchangers transfer heat from the pressurised water to feed water circulating in pipework 22 of a secondary coolant circuit, thereby producing steam which is used to drive turbines which in turn drive an electricity-generator. The steam is then condensed in one or more condensers (not shown) before returning to the steam generators. The condensers transfer heat from the condensed steam to a tertiary coolant circuit (not shown) which circulates water between a tertiary heatsink (i.e. the sea, a lake, or a river) and the condensers.

Figure 2:
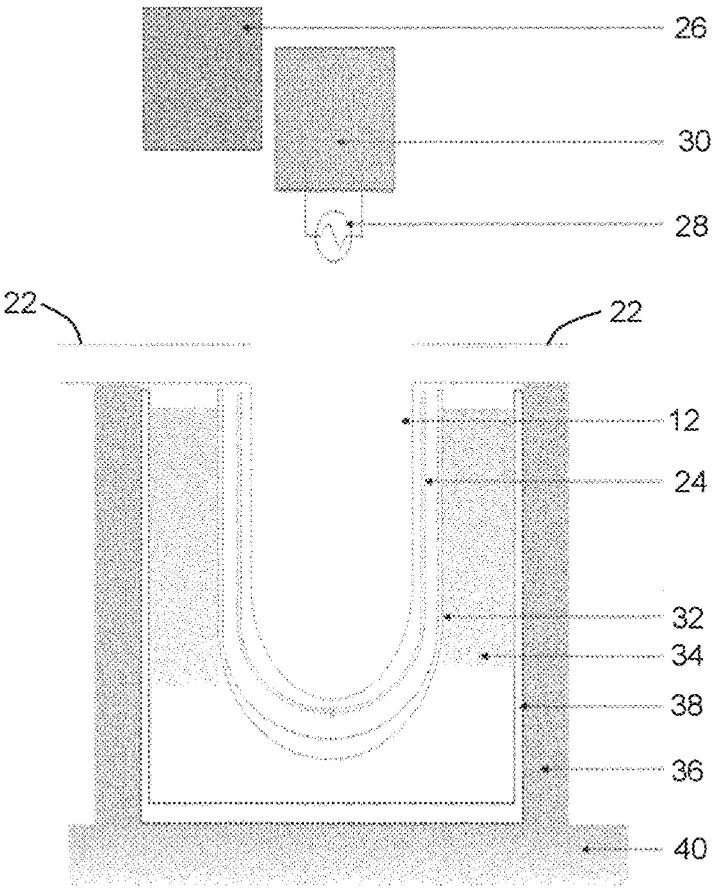
FIG. 2 is a schematic diagram of molten core emergency containment levels of the plant.

In addition to the primary, secondary and tertiary circuits, the power plant 10 has molten core emergency containment levels, shown schematically in FIG. 2. In particular, the plant implements a triple layer melt retention strategy, namely: 1) IVR (in vessel retention), 2) EVCC (ex-vessel corium cooling), 3) and ACCC (air cooled ceramic core catcher). This gives three opportunities for melt retention, rather than just one. Moving down the list from 1) to 3), the equipment demanded for proper performance of each layer reduces such that system dependency constraints are reduced, and the conditional probability of failure shrinks. The ordering of the levels also advantageously reduces the corium spread area. The melt temperature and melt volume increase on moving down the list from 1) to 3), and so the temperature difference with the surroundings and out-of-containment increases, promoting greater heat fluxes from the melt and thereby improving the likelihood of solidification. The delay produced in having to progress through the layers also reduces decay heat levels, and the increased mass reduces decay heat volumetric density, again improving the likelihood of solidification.

The three levels are also diverse, which helps to promote their reliability and robustness.

More particularly, the IVR level involves flooding of a cavity formed between the RPV 12 and a thermal insulation shield 24 to solidify core melt in the lower head of the RPV. In normal operation, this cavity is air-filled and the shield operates to retain heat in the reactor. However, in the event of an emergency requiring cooling of the nuclear reactor, the shield becomes a water retention jacket that allows the RPV to be submerged in cooling water. This water comes from a supply system, such as water storage tank 26 which can be located above the RPV so that its water may be gravity-fed into the cavity.

The water entering the cavity boils off as steam on contact with the RPV 12, but the supply system can be configured to constantly replenish this lost water and maintain the water in the cavity at a given level. Any excess water to the cavity may be channelled to the water filled tank 36. The plant may further have one or more heat exchangers 28 arranged to condense the steam. Conveniently these can be mounted on the wall of a containment structure of the plant, and the condensed steam can then be channelled back to the cavity or to the water filled tank 36. The cold side of the heat exchangers is a suitable heatsink, such as one or more further cold water tanks 30.

The EVCC level is provided by a metal (typically steel) primary core catcher 32 which is located outside the shield 24 and is typically spaced from the shield by an air gap. This core catcher may be submerged in the water 34 of a permanently filled further tank 36 (discussed below) so that its outer surface is water-cooled, enhancing its ability to extract heat from and thereby safely retain any corium which escapes the IVR level. The EVCC level has no moving mechanical parts and the primary core catcher is thick enough to withstand corium mass transfer from the RPV.

Nonetheless, in the increasingly unlikely event that the primary core catcher 32 fails (e.g. through jet ablation thereof), the ACCC level comprises the water-filled tank 36 which is internally lined by a ceramic secondary core catcher 38 and mounted on a substantial containment basement 40. Typically, the walls of the tank behind the ceramic liner and the containment basement are formed of concrete. The outer surface of the tank is air-cooled.

The ACCC level also has no moving parts and no water replenishment requirements. The ceramic secondary core catcher 38 is configured such that it does not melt on contact with molten corium, or melts slowly enough such that re-freeze of the corium is achieved before melt through.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A nuclear power plant having:

a nuclear reactor including a reactor pressure vessel which houses plural fuel rods containing fissile material, an exterior of the reactor pressure vessel being surrounded by air during normal operation;

means for water-cooling the exterior of the reactor pressure vessel in an event of an emergency requiring cooling of the nuclear reactor;

a primary core catcher outwardly of the reactor pressure vessel, the primary core catcher being formed of a material suitable for retaining molten corium in an event corium escapes the reactor pressure vessel; and a tank, which is water-filled in normal use of the plant to submerge and thereby water-cool the primary core catcher, the tank having a lining providing a secondary core catcher outwardly of the primary core catcher, the secondary core catcher being formed of a material suitable for retaining molten corium in the event corium escapes the primary core catcher.

2. The nuclear power plant according to claim 1, wherein the means for water-cooling the exterior of the reactor pressure vessel comprises means for cooling the reactor pressure vessel by submerging the reactor pressure vessel in water.

3. The nuclear power plant according to claim 2, wherein the means for water-cooling the reactor pressure vessel by submerging the reactor pressure vessel in water comprises a water retention jacket outside the reactor pressure vessel, the jacket being spaced from the reactor pressure vessel such that a cavity between the jacket and the reactor pressure vessel is fillable with water to submerge and thereby water-cool the reactor pressure vessel in the event of the emergency.

4. The nuclear power plant according to claim 3, wherein the water retention jacket functions as a thermal insulation shield in normal operation of the nuclear reactor to retain heat in the reactor, the cavity between the jacket and the reactor pressure vessel being an air cavity in such normal operation.

5. The nuclear power plant according to claim 1, wherein the means for water-cooling the exterior of the reactor pressure vessel comprises a supply system for supplying the water for submerging the reactor pressure vessel in the event of the emergency.

6. The nuclear power plant according to claim 1, further having one or more heat exchangers arranged to condense steam formed by boiling of the water submerging the reactor pressure vessel.

7. The nuclear power plant according to claim 1, wherein the primary core catcher is a core catcher made from metal.

8. The nuclear power plant according to claim 1, wherein the secondary core catcher is a core catcher made from ceramic.

9. The nuclear power plant according to claim 1, wherein the secondary core catcher is externally air cooled.

10. A method of operating the nuclear power plant according to claim 1, the method including:

normally operating the power plant, the exterior of the reactor pressure vessel being surrounded by air during the normal operation; and water-cooling the exterior of the reactor pressure vessel in the event of an emergency requiring cooling of the nuclear reactor, or in an event of a safety test of the power plant.

11. The method according to claim 10, wherein water-cooling the exterior of the reactor pressure vessel comprises submerging the reactor pressure vessel in water.

* * * * *